United States Patent
Nuanes et al.

(10) Patent No.: US 11,918,969 B2
(45) Date of Patent: Mar. 5, 2024

(54) LOW DUSTING, SMALL CLUMPING HIGHLY ABSORPTIVE ANIMAL LITTER

(71) Applicant: THE CLOROX COMPANY, Oakland, CA (US)

(72) Inventors: Anisa M. Nuanes, Pleasanton, CA (US); Jacob L. Orlowicz, Pleasanton, CA (US); Robert W. Peugh, Pleasanton, CA (US); Donald K. Swatling, Pleasanton, CA (US); Ahmed Drief, Pleasanton, CA (US)

(73) Assignee: THE CLOROX COMPANY, Oakland, CA (US)

( * ) Notice: Subject to any disclaimer, the term of this patent is extended or adjusted under 35 U.S.C. 154(b) by 727 days.

(21) Appl. No.: 17/112,779

(22) Filed: Dec. 4, 2020

(65) Prior Publication Data
US 2021/0169037 A1    Jun. 10, 2021

Related U.S. Application Data

(60) Provisional application No. 62/944,504, filed on Dec. 6, 2019.

(51) Int. Cl.
*B01J 20/00* (2006.01)
*A01K 1/015* (2006.01)

(52) U.S. Cl.
CPC ............. *B01J 20/00* (2013.01); *A01K 1/0154* (2013.01)

(58) Field of Classification Search
CPC ............................. B01J 20/00; A01K 1/0154
See application file for complete search history.

(56) References Cited

U.S. PATENT DOCUMENTS

| | | | |
|---|---|---|---|
| 29,783 | A | 8/1860 | Harris |
| 33,983 | A | 12/1861 | Cauhaupe |
| 3,029,783 | A | 4/1962 | Sawyer, Jr. et al. |
| 3,059,615 | A | 10/1962 | Kuceski et al. |
| 3,776,188 | A | 12/1973 | Komakine |

(Continued)

FOREIGN PATENT DOCUMENTS

| | | |
|---|---|---|
| CA | 2546538 A1 | 11/2007 |
| CA | 2955705 A1 | 1/2022 |

(Continued)

OTHER PUBLICATIONS

Extended European Search Report received for EP Patent Application No. 21175668.9, dated Dec. 3, 2021, 6 pages.

*Primary Examiner* — Brian A McCaig
(74) *Attorney, Agent, or Firm* — Workman Nydegger

(57) ABSTRACT

Animal litter comprising composite particles including powdered sodium bentonite and powdered activated carbon, agglomerated together into the composite particles, wherein the animal litter has a particle size distribution of 16/50 mesh (i.e., 300 μm to 1180 μm in size). The litter may include non-composite, granular clay particles (e.g., granular sodium bentonite) having the same particle size distribution (16/50 mesh). Such particle size characteristics significantly reduce dusting, without the need for a de-dusting agent, reduce clump depth and/or reduce clump width at the bottom of the clump (both acting to reduce risk of clumps sticking to the bottom of the litter box) and result in more efficient use of the litter in clumping (reduced clump weight) by increasing absorbency.

20 Claims, 3 Drawing Sheets

(56) References Cited

U.S. PATENT DOCUMENTS

| | | |
|---|---|---|
| 3,789,797 A | 2/1974 | Brewer |
| 3,821,346 A | 6/1974 | Batley, Jr. |
| 3,892,846 A | 7/1975 | Wortham |
| 3,898,324 A | 8/1975 | Komakine |
| 3,921,581 A | 11/1975 | Brewer |
| 3,993,584 A | 11/1976 | Owen et al. |
| 4,059,545 A | 11/1977 | Corbett et al. |
| 4,085,704 A | 4/1978 | Frazier |
| 4,187,803 A | 2/1980 | Valenta |
| 4,256,728 A | 3/1981 | Nishino et al. |
| 4,263,873 A | 4/1981 | Christianson |
| 4,275,684 A | 6/1981 | Kramer et al. |
| 4,306,516 A | 12/1981 | Currey |
| 4,355,593 A | 10/1982 | Stapley |
| 4,407,231 A | 10/1983 | Colborn et al. |
| 4,437,429 A | 3/1984 | Goldstein et al. |
| 4,506,628 A | 3/1985 | Stockel |
| 4,517,308 A | 5/1985 | Ehlenz et al. |
| 4,560,527 A | 12/1985 | Harke et al. |
| 4,565,794 A | 1/1986 | de Buda |
| 4,568,453 A | 2/1986 | Lowe, Jr. |
| 4,591,581 A | 5/1986 | Crampton et al. |
| 4,607,594 A | 8/1986 | Thacker |
| 4,621,011 A | 11/1986 | Fleischer et al. |
| 4,638,763 A | 1/1987 | Greenberg |
| 4,640,225 A | 2/1987 | Yananton |
| 4,641,605 A | 2/1987 | Gordon |
| 4,657,881 A | 4/1987 | Crampton et al. |
| 4,664,843 A | 5/1987 | Burba, III et al. |
| 4,671,208 A | 6/1987 | Smith |
| 4,677,086 A | 6/1987 | McCue et al. |
| 4,704,989 A | 11/1987 | Rosenfeld |
| 4,721,059 A | 1/1988 | Lowe et al. |
| 4,756,273 A | 7/1988 | Yananton |
| 4,793,837 A | 12/1988 | Pontius |
| 4,824,810 A | 4/1989 | Lang et al. |
| 4,837,020 A | 6/1989 | Mise et al. |
| 4,844,010 A | 7/1989 | Ducharme et al. |
| 4,866,023 A | 9/1989 | Ritter et al. |
| 4,869,204 A | 9/1989 | Yananton |
| 4,881,490 A | 11/1989 | Ducharme et al. |
| 4,914,066 A | 4/1990 | Woodrum |
| 4,920,090 A | 4/1990 | Ritter et al. |
| 4,949,672 A | 8/1990 | Ratcliff et al. |
| 5,005,115 A | 3/1991 | Hughes |
| 5,005,520 A | 4/1991 | Michael |
| 5,013,335 A | 5/1991 | Marcus |
| 5,014,650 A | 5/1991 | Sowle et al. |
| 5,018,482 A | 5/1991 | Stanislowski et al. |
| 5,019,254 A | 5/1991 | Abrevaya et al. |
| 5,032,549 A | 7/1991 | Lang et al. |
| 5,062,383 A | 11/1991 | Nelson |
| 5,079,201 A | 1/1992 | Chu et al. |
| 5,094,189 A | 3/1992 | Aylen et al. |
| 5,094,190 A | 3/1992 | Ratcliff et al. |
| 5,100,600 A | 3/1992 | Keller et al. |
| 5,101,771 A | 4/1992 | Goss |
| 5,109,805 A | 5/1992 | Baldry et al. |
| 5,129,365 A | 7/1992 | Hughes |
| 5,135,743 A | 8/1992 | Stanislowski et al. |
| 5,143,023 A | 9/1992 | Kuhns |
| 5,146,877 A | 9/1992 | Jaffee et al. |
| 5,152,250 A | 10/1992 | Loeb |
| 5,176,107 A | 1/1993 | Buschur |
| 5,176,108 A | 1/1993 | Jenkins et al. |
| 5,176,879 A | 1/1993 | White et al. |
| 5,183,010 A | 2/1993 | Raymond et al. |
| 5,183,655 A | 2/1993 | Stanislowski et al. |
| 5,188,064 A | 2/1993 | House |
| 5,193,489 A | 3/1993 | Hardin |
| 5,196,473 A | 3/1993 | Valenta et al. |
| 5,204,310 A | 4/1993 | Tolles et al. |
| 5,206,207 A | 4/1993 | Tolles |
| 5,207,830 A | 5/1993 | Cowan et al. |
| 5,210,112 A | 5/1993 | Shimoda et al. |
| 5,230,305 A | 7/1993 | House |
| 5,232,627 A | 8/1993 | Burba, III et al. |
| 5,238,470 A | 8/1993 | Tolles et al. |
| 5,250,491 A | 10/1993 | Yan |
| 5,276,000 A | 1/1994 | Matthews et al. |
| 5,279,259 A | 1/1994 | Rice et al. |
| 5,295,456 A | 3/1994 | Lawson |
| 5,303,676 A | 4/1994 | Lawson |
| 5,304,527 A | 4/1994 | Dimitri |
| 5,317,990 A | 6/1994 | Hughes |
| 5,318,953 A | 6/1994 | Hughes |
| 5,320,066 A | 6/1994 | Gunter |
| 5,325,816 A | 7/1994 | Pattengill et al. |
| 5,329,880 A | 7/1994 | Pattengill et al. |
| 5,339,769 A | 8/1994 | Toth et al. |
| 5,345,787 A | 9/1994 | Piltingsrud |
| 5,359,961 A | 11/1994 | Goss et al. |
| 5,361,719 A | 11/1994 | Kiebke |
| 5,386,803 A | 2/1995 | Hughes |
| 5,389,325 A | 2/1995 | Bookbinder et al. |
| 5,407,442 A | 4/1995 | Karapasha |
| 5,421,291 A | 6/1995 | Lawson et al. |
| 5,450,817 A | 9/1995 | Hahn et al. |
| 5,452,684 A | 9/1995 | Elazier-Davis et al. |
| 5,458,091 A | 10/1995 | Pattengill et al. |
| 5,469,809 A | 11/1995 | Coleman |
| 5,480,584 A | 1/1996 | Urano et al. |
| 5,503,111 A | 4/1996 | Hughes |
| 5,529,022 A | 6/1996 | Nelson |
| 5,538,932 A | 7/1996 | Yan et al. |
| 5,542,374 A | 8/1996 | Palmer, Jr. |
| 5,566,642 A | 10/1996 | Ochi |
| 5,577,463 A | 11/1996 | Elazier-Davis et al. |
| 5,579,722 A | 12/1996 | Yamamoto et al. |
| 5,609,123 A | 3/1997 | Luke et al. |
| 5,634,431 A | 6/1997 | Reddy et al. |
| 5,638,770 A | 6/1997 | Peleties |
| 5,647,300 A | 7/1997 | Tucker |
| 5,648,306 A | 7/1997 | Hahn et al. |
| 5,655,480 A | 8/1997 | Steckel |
| 5,664,523 A | 9/1997 | Ochi et al. |
| 5,680,830 A | 10/1997 | Kawaguchi et al. |
| 5,691,270 A | 11/1997 | Miller |
| 5,735,232 A | 4/1998 | Lang et al. |
| 5,736,481 A | 4/1998 | Miller |
| 5,736,485 A | 4/1998 | Miller |
| 5,740,761 A | 4/1998 | Lee et al. |
| 5,743,213 A | 4/1998 | Fujiura |
| 5,762,023 A | 6/1998 | Carter |
| 5,775,259 A | 7/1998 | Tucker |
| 5,806,462 A | 9/1998 | Parr |
| 5,826,543 A | 10/1998 | Raymond et al. |
| 5,836,263 A | 11/1998 | Goss et al. |
| 5,860,391 A | 1/1999 | Maxwell et al. |
| 5,863,858 A | 1/1999 | Miller et al. |
| 5,901,661 A | 5/1999 | Pattengill et al. |
| 5,927,049 A | 7/1999 | Simard |
| 5,944,704 A | 8/1999 | Guarracino et al. |
| 5,970,915 A | 10/1999 | Schlueter et al. |
| 5,975,019 A | 11/1999 | Goss et al. |
| 5,992,351 A | 11/1999 | Jenkins |
| 6,015,547 A | 1/2000 | Yum |
| 6,019,063 A | 2/2000 | Haubensak et al. |
| 6,025,319 A | 2/2000 | Surutzidis et al. |
| 6,030,565 A | 2/2000 | Golan |
| 6,039,004 A | 3/2000 | Goss et al. |
| 6,080,908 A | 6/2000 | Guarracino et al. |
| 6,089,189 A | 7/2000 | Goss et al. |
| 6,089,190 A | 7/2000 | Jaffee et al. |
| 6,101,978 A | 8/2000 | Steckel |
| 6,194,065 B1 | 2/2001 | Golan |
| 6,206,947 B1 | 3/2001 | Evan et al. |
| 6,216,634 B1 | 4/2001 | Kent et al. |
| 6,220,206 B1 | 4/2001 | Sottillo et al. |
| 6,260,511 B1 | 7/2001 | Hsu |
| 6,276,300 B1 | 8/2001 | Lewis, II et al. |
| 6,287,550 B1 | 9/2001 | Trinh et al. |
| 6,294,118 B1 | 9/2001 | Huber et al. |
| 6,308,658 B1 | 10/2001 | Steckel |

(56) References Cited

U.S. PATENT DOCUMENTS

| | | |
|---|---|---|
| 6,319,342 B1 | 11/2001 | Riddell |
| 6,354,243 B1 | 3/2002 | Lewis, II et al. |
| 6,371,050 B1 | 4/2002 | Mochizuki |
| 6,405,677 B2 | 6/2002 | McPherson et al. |
| 6,405,678 B2 | 6/2002 | Ikegami et al. |
| 6,426,325 B1 | 7/2002 | Dente et al. |
| 6,472,343 B1 | 10/2002 | McCrae et al. |
| 6,499,984 B1 | 12/2002 | Ghebre-Sellassie et al. |
| 6,543,385 B2 | 4/2003 | Raymond |
| 6,578,521 B2 | 6/2003 | Raymond et al. |
| 6,740,406 B2 | 5/2004 | Hu et al. |
| 6,860,234 B2 | 3/2005 | Raymond et al. |
| 6,962,129 B1 | 11/2005 | Lawson |
| 7,429,421 B2 | 9/2008 | Greene et al. |
| 7,665,418 B2 | 2/2010 | Bracilovic |
| 7,856,946 B2 | 12/2010 | Burckbucher, Jr. |
| 8,156,896 B2 | 4/2012 | Wadams et al. |
| 8,273,676 B2 | 9/2012 | Falcone et al. |
| 8,584,617 B2 | 11/2013 | Greene et al. |
| 8,720,375 B2 | 5/2014 | Miller et al. |
| 8,722,031 B2 | 5/2014 | Lawson et al. |
| 8,733,288 B2 | 5/2014 | Winkleman et al. |
| 8,881,681 B2 | 11/2014 | Zhang |
| 8,904,963 B2 | 12/2014 | Dixon et al. |
| 9,010,273 B2 | 4/2015 | Adamy et al. |
| 9,072,276 B2 | 7/2015 | Pechera et al. |
| 9,119,374 B2 | 9/2015 | Bracilovic et al. |
| 9,283,540 B2 | 3/2016 | Fritter et al. |
| 9,398,754 B2 | 7/2016 | Zhang et al. |
| 9,986,714 B2 | 6/2018 | Huck et al. |
| 10,383,308 B2 | 8/2019 | Nga et al. |
| 2001/0018308 A1 | 8/2001 | Quick et al. |
| 2001/0049514 A1 | 12/2001 | Dodge, II et al. |
| 2002/0000207 A1 | 1/2002 | Ikegami |
| 2002/0007800 A1 | 1/2002 | Ochi et al. |
| 2002/0014209 A1 | 2/2002 | Bloomer |
| 2002/0054919 A1 | 5/2002 | Hochwalt et al. |
| 2002/0117117 A1 | 8/2002 | Raymond et al. |
| 2002/0153311 A1 | 10/2002 | Farquhar Davidson |
| 2002/0183201 A1 | 12/2002 | Barnwell et al. |
| 2003/0051673 A1 | 3/2003 | Raymond et al. |
| 2003/0072733 A1 | 4/2003 | McGee et al. |
| 2003/0131799 A1 | 7/2003 | Wong et al. |
| 2003/0148100 A1 | 8/2003 | Greene et al. |
| 2005/0005869 A1 | 1/2005 | Fritter |
| 2006/0042553 A1 | 3/2006 | Venezio |
| 2011/0185977 A1 | 8/2011 | Dixon et al. |
| 2012/0260860 A1 | 10/2012 | Drief et al. |
| 2012/0318205 A1 | 12/2012 | Kuras et al. |
| 2013/0239901 A1 | 9/2013 | Pechera et al. |
| 2013/0266657 A1 | 10/2013 | Trajkovska |
| 2013/0269623 A1 | 10/2013 | Lawson |
| 2013/0305997 A1 | 11/2013 | Miller |
| 2015/0181831 A1 | 7/2015 | Huck et al. |
| 2018/0064059 A1 | 3/2018 | Brown et al. |
| 2019/0297835 A1 | 10/2019 | Cortner et al. |
| 2019/0320612 A1 | 10/2019 | Nga et al. |
| 2020/0329661 A1 * | 10/2020 | Li ................. B01J 20/20 |

FOREIGN PATENT DOCUMENTS

| | | |
|---|---|---|
| EP | 0573303 A1 | 12/1993 |
| EP | 716806 | 6/1996 |
| EP | 0823206 A1 | 2/1998 |
| EP | 0885557 A1 | 12/1998 |
| EP | 0579764 | 8/1999 |
| EP | 0612533 | 11/1999 |
| EP | 0759323 B1 | 7/2001 |
| EP | 1346634 | 9/2003 |
| JP | S62-239932 | 10/1987 |
| JP | 04287626 A | 10/1992 |
| JP | 6-14669 | 1/1994 |
| JP | 06343362 A | 12/1994 |
| JP | 07-041202 | 8/1996 |
| JP | 10-262482 | 10/1998 |
| WO | WO 90/09099 | 8/1990 |
| WO | WO 96/02129 A1 | 2/1996 |
| WO | WO 98/12291 | 3/1998 |
| WO | WO 98/27261 | 6/1998 |
| WO | WO 99/33335 | 7/1999 |
| WO | WO 99/40776 | 8/1999 |
| WO | WO 99/45764 | 9/1999 |
| WO | WO 00/37020 | 6/2000 |
| WO | WO 01/19177 | 3/2001 |
| WO | WO 02/056673 | 7/2002 |
| WO | WO 02/060496 | 8/2002 |
| WO | WO 03/032719 | 4/2003 |
| WO | WO 03/065796 | 8/2003 |

\* cited by examiner

LOW DUSTING, SMALL CLUMPING HIGHLY ABSORPTIVE ANIMAL LITTER

CROSS-REFERENCE TO RELATED APPLICATIONS

This application claims the benefit of and priority to U.S. Provisional Patent Application No. 62/944,504 filed Dec. 6, 2019, which is herein incorporated by reference in its entirety.

BACKGROUND OF THE INVENTION

1. The Field of the Invention

The present invention relates to litter for use by domestic animals. For example, such litter is typically employed by pet owners to absorb urine and collect feces.

2. Description of Related Art

Many people enjoy the company of one or more domestic pets. Litter boxes are typically provided for the use of such animals in the collection of urine and feces. Such a litter box is typically filled with an absorbent granular material (e.g., sand and/or clay), which aids in collecting the bodily wastes produced by pets. Some existing litter products provide "clumping" capability, by which the litter particles clump together when wetted (e.g., by urine). Sodium bentonite clay is often used in such clumping litter products. While clumping characteristics allow a user to easily remove used clumped litter portions, leaving adjacent unused litter product in the litter box for future use, existing clumping litters also tend to form clump geometries that often extend deep into the litter box, often adhering to the bottom of the litter box, making it difficult to remove such clumps.

Another problem with existing sodium bentonite clay litters is the inability to effectively control malodors. Clay has very poor odor-control qualities, and inevitably waste build-up leads to severe malodor production.

Another difficulty with existing litter products is a tendency for litter to generate dust while the litter is being poured or otherwise handled. The smallest particles (i.e. fines) produce dust that can be a significant dissatisfier to the consumer when pouring or scooping it the litter.

It would be an advancement in the art to provide litter products that were specifically configured to provide clumping, but where the clumps formed were less likely to adhere to the litter box. It would be a further advancement if the formation of clumps were more efficient (e.g., reducing clump weight for a given weight of water or urine dosed on the litter, resulting in increased consumer usage provided for a given weight of litter). It would also be advantageous if this could be achieved while reducing dusting characteristics, without requiring use of a synthetic de-dusting agent, such as polytetrafluoroethylene (PTFE), lignosulfate or mineral oil, while also providing superior odor control.

BRIEF SUMMARY OF THE INVENTION

Applicant has surprisingly found that improved dusting characteristics, and more efficient use of the litter during clumping (e.g., reduced clump depth and decreased clump weight when wetted with a given volume of urine, water or other liquid) can be achieved by adjusting the mesh size of particles included within the litter product. For example, a typical litter product includes litter particles with mesh size ranging from 8 mesh down to 40 mesh or from 12 mesh down to 40 mesh. By way of example, particles that will pass through 8 mesh are sized 2.36 mm (2360 µm) or less, while particles that will not pass through a 40 mesh are sized larger than 0.425 mm (425 µm). Such a particle size distribution is routinely referred to within the art as 8/40. Similarly, a 12/40 particle size distribution refers to a particle size distribution including particles with sizes ranging from larger than 0.425 mm (425 µm) up to 1.7 mm (1700 µm).

Applicant has discovered that by adjusting the particle size distribution to 16/50 (0.3 mm (300 µm) to 1.18 mm (1180 µm)), significant improvements are obtained in reducing dusting, in achieving increased absorbency for more efficient clumping, and in significantly reducing the clump depth and/or clump width at the bottom of the clump (where sticking to the litter box may occur). More efficient clumping means that the consumer is able to get longer usage from a given weight of litter (as clumps formed by dosing the litter with a given volume of liquid weigh less). Reduced clump depth and reduced clump width at the bottom of the clump reduces the risk that the clump formed will stick to the bottom of the litter box.

The present litter products may exhibit excellent, low dusting characteristics without inclusion of a de-dusting agent, such as PTFE, lignosulfonate or mineral oil.

It is surprising that increasing the smaller particle or so-called fines content in a litter product (e.g., by moving the small particle cut-off from 40 mesh to 50 mesh) would somehow result in decreased dusting, although such a result is shown by the data provided herein.

One embodiment according to the present invention is directed to an animal litter comprising composite particles, including powdered sodium bentonite and powdered activated carbon ("PAC"), agglomerated together, where the animal litter ranges in size from 0.3 mm or 300 µm (50 mesh) to 1.18 mm or 1180 µm (16 mesh).

Another embodiment according to the present invention is directed to an animal litter comprising composite particles, including powdered sodium bentonite and powdered activated carbon ("PAC"), dry blended with granular sodium bentonite, where the animal litter ranges in size from 0.3 mm or 300 µm (50 mesh) to 1.18 mm or 1180 µm (16 mesh).

Another embodiment according to the present invention is directed to an animal litter comprising composite particles, including powdered sodium bentonite and powdered activated carbon ("PAC"), where the animal litter ranges in size from 0.3 mm or 300 µm (50 mesh) to 1.18 mm or 1180 µm (16 mesh), and the litter is void of a de-dusting agent.

Another embodiment according to the present invention is directed to an animal litter comprising a blend of granular clay material and composite particles and the composite particles include powdered sodium bentonite and powdered activated carbon agglomerated together into the composite particles. The animal litter ranges in size from 300 µm to 1180 µm (16 to 50 mesh) and the composite particles are present in the blend in an amount of about 30% by weight or more and the granular clay material is present in an amount of about 70% by weight of the blend. The blend exhibits an absorbency that is at least about 40% greater than a litter product having a particle size distribution of 8/40 mesh (425 µm to 2360 µm).

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings.

DETAILED DESCRIPTION

I. Definitions

Figure 1:
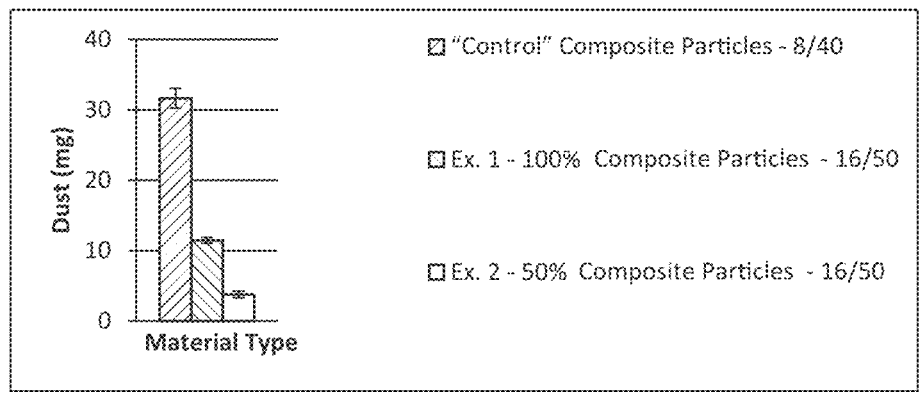
FIG. 1 shows results of a gravimetric dust measurement test for two litter products according to the present invention, as compared to a comparative litter product.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising," which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a", "an" and "the" include plural referents unless the content clearly dictates otherwise. Thus, for example, reference to a "filler" includes one, two or more such fillers.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. As such, all values herein are understood to be modified by the term "about". A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 10%, within 5%, within 1%, etc. of a stated value.

Some ranges may be disclosed herein. Additional ranges may be defined between any values disclosed herein as being exemplary of a particular parameter. All such ranges are contemplated and within the scope of the present disclosure.

In the application, effective amounts are generally those amounts listed as the ranges or levels of ingredients in the descriptions, which follow hereto. Unless otherwise stated, amounts listed in percentage ("%'s") are in weight percent (based on 100% active) of any composition.

The phrase "free of", "void of" or similar phrases if used herein means that the composition or article comprises 0% of the stated component, that is, the component has not been intentionally added. However, it will be appreciated that such components may incidentally form thereafter, under some circumstances, or such component may be incidentally present, e.g., as an incidental contaminant.

The phrase "substantially free of", "substantially void of" or similar phrases as used herein means that the composition or article preferably comprises 0% of the stated component, although it will be appreciated that very small concentrations may possibly be present, e.g., through incidental formation, contamination, or even by intentional addition. Such components may be present, if at all, in amounts of less than 1%, less than 0.5%, less than 0.25%, less than 0.1%, less than 0.05%, less than 0.01%, less than 0.005%, less than 0.001%, or less than 0.0001%. In some embodiments, the compositions or articles described herein may be free or substantially free from any specific components not mentioned within this specification.

Particle size ranges and distributions as described herein are determined by typical screening methods known to those of skill in the art.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

The present invention relates to litter products, including composite absorbent particles that comprise powdered sodium bentonite and powdered activated carbon "PAC", where the particles of the litter composition are screened to exhibit particular size characteristics, which have been found by Applicant to provide for more efficient clumping (i.e., use less litter mass when forming a clump), reduced clump depth and/or clump width at a bottom of the clump (reducing risk of the formed clump adhering to the bottom of the litter box), and/or reduced dusting characteristics. In particular, Applicant has surprisingly found that by adjusting the lower cut-off threshold for particle size so as to accommodate smaller particles than are typically included (e.g., using a lower limit of 50 mesh (300 µm) rather than 40 mesh (425 µm)), particularly when coupled with narrowing the upper cut-off threshold for particle size (excluding the relatively larger particles typically included in a litter product), e.g., using an upper limit of 16 mesh (1180 µm) rather than 8 mesh (2360 µm) or 12 mesh (1700 µm), that these benefits can be achieved.

It is particularly surprising that significant reductions in dust generation are achieved when pouring the novel litter compared to a conventional litter product that includes a de-dusting agent, such as PTFE or mineral oil. Accordingly, a de-dusting agent is not required in the present litter composition to achieve the reduction in dust generation.

For example, the litter products described herein may exhibit reductions in dust levels (e.g., in a gravimetric dust test, or a visual dust test) of 40% or more, or 50% or more, as compared to existing litter products, without inclusion of a de-dusting agent. Similarly, the litter products may exhibit reductions in clump depth (i.e., penetration depth of the liquid in a litter) of 40% or more, or 50% or more, reductions in clump width at the bottom of the clump of 25% or more, or 35% or more, and reductions in clump weight of 40% or more, or 50% or more, as compared to existing litter products. All of such can be achieved by simply adjusting the particle size characteristics of the litter particles included in the litter.

Such litter products have been shown to exhibit more efficient clumping characteristics (e.g., shallower clump depth and lower clump weight), allowing the given amount of litter (e.g., 20 lb or 25 lb container) to be used for a longer period of time, which reduces the frequency that a pet owner must replace the litter within a litter box, how often they are required to repurchase new litter, and reducing the amount of litter that ends up in waste streams.

III. Exemplary Litter Products and Their Components a. Composite Particles

A composite particle is a discrete particle formed by the agglomeration of smaller component particles. By way of example, components that may be included in such composite particles include, but are not limited to, powdered sodium bentonite, PAC and optional powdered fillers.

Composite particles can be formed using a high shear or other agglomeration process including, but not limited to, a pin mixer, a pelletizer, an extruder or the like where the agglomeration process is used to form the discrete composite particles. A pin mixer is a pin-type, high speed, conditioning and micro-pelletizing device that converts small particles (i.e., powders) into larger, discrete agglomerates ("composite particles") through the action of high speed and the addition of a binder, which can be a simple binder such as water.

Such agglomeration processes and the composite particles they produce are described in Applicant's U.S. Pat. No. 9,283,540, herein incorporated by reference in its entirety. Such processes are also described in Applicant's U.S. Pat. No. 10,383,308, also incorporated herein by reference in its entirety.

All components used in forming the composite particles typically are of initially very small particle sizes, so as to be accurately described as powders. They are smaller than "granular" materials that may be dry blended with the composite particles. Particles this small contribute to dusting and/or tracking problems. Inclusion of the powdered components within the composite particle provides the individual components without inclusion as separate and discrete very small particles dry blended in the litter composition.

The composite particles contain (relative to each other) approximately the same level of the various components used to form such particles. Furthermore, such composite particles typically do not include a core and shell structure, but a relatively homogenous distribution of the powder components from which the composite particle is formed.

The composite particles are larger than their constituent components and have particle sizes ranging from about 300 µm (0.3 mm) to about 1180 µm (1.18 mm) (i.e., 16/50 mesh).

i. Powdered Sodium Bentonite

The composite particles can include powdered sodium bentonite. The powdered sodium bentonite has particle sizes as described herein, which are significantly smaller than granular sodium bentonite. Inclusion of the powdered sodium bentonite within the composite particle aids in binding and clumping of the litter composition. The powdered sodium bentonite used to form the composite particles have particle sizes of less than 40 mesh (0.4 mm) (400 µm).

ii. Powdered Activated Carbon (PAC)

The composite particles can include a powdered activated carbon (PAC) component. Powdered activated carbon is a fine black powder made from wood or other carbon-containing materials (e.g., coconut, coal, etc.) that have been exposed to high temperatures in a reduced or oxygen free environment and treated, or activated, to increase the material's surface area by heating in the presence of an oxidizing gas or other chemicals. The result is a highly porous fine powder with particle sizes as described herein, which material is capable of absorbing odor causing volatile compounds.

The inclusion of PAC or a similar odor control agent in the composite particle increases the odor control properties of the present litter compositions. For example, PAC particles used in forming such composite particles have a particle size ranging from about 40 µm to about 150 µm. Inclusion of the PAC within the composite particle provides excellent odor control properties, without inclusion of separate and discrete very small particles dry blended in the litter composition. For this reason, the present litter compositions include higher amounts of PAC than is typically included in litter compositions, such as greater than 1% of the litter composition. Normally, such a high PAC content would be wasteful because the loose small particles can segregate. In the present embodiments, the high PAC content works in tandem with greater absorbency and increased efficiency to provide longer lasting litter with superior odor control. By providing a substantially uniform composition from one composite particle to the next, the odor control efficacy of the carbon is not sacrificed because the distribution of the PAC within the composite particles is maximized and surface area is increased. PAC content is greater than 1%, greater than 1% to about 3%, and greater than 1% to about 5%, by weight of the composite particles or by weight of the litter composition as a whole. The PAC used to form the composite particles have particle sizes of about 40 μm to about 150 μm (0.04 mm to 0.15 mm).

iii. Powdered Fillers

The composite particles can optionally include a powdered filler material. Such a powdered filler is typically a non-absorbent material that is more readily available than sodium bentonite clay and replaces a portion of the more expensive or scarce clay. Examples of filler materials include, but are not limited to inorganic, mineral materials such as limestone, dolomite, calcite, calcium carbonates, sand, shale, gravel, and slate. The powdered filler used to form the composite particles have particle sizes of less than 40 mesh (0.4 mm) (400 μm). Powdered filler content is about 20% to about 50% by weight of the composite particles.

b. Granular Sodium Bentonite

Granular sodium bentonite is characterized by larger particle sizes than powdered sodium bentonite. Sodium bentonite clay is either (a) mined, crushed and sieved or (b) processed by methods known in the industry to achieve a suitable particle size (e.g., a 16/50 particle size distribution). Sodium bentonite expands when wet, absorbing as much as several times its dry mass in water and known in the industry as a "swelling" clay. Sodium bentonite panicles exhibit gel-like qualities when wet that promote clumping of the sodium bentonite particles when liquid (such as urine) is applied. Hence, its application in animal litters. The granular sodium bentonite may be dry blended with the composite particles. Within such a blend, random and relatively consistent particle distribution of discrete particles of the two or more types exist throughout the mixture. The granular sodium bentonite particles are the same size as the composite particles. Accordingly, the granular sodium bentonite has particle sizes ranging from about 300 μm (0.3 mm) to about 1180 μm (1.18 mm) (i.e., 16/50 mesh).

c. Dry Blends Including the Composite Particles

The composite particles could be dry blended with other granular materials, such as granular sodium bentonite, to form the litter product in any desired weight ratio. By way of example, a blending ratio of composite particles to sodium bentonite may range from about 10:1 to about 1:10, from about 5:1 to about 1:5, from about 3:1 to about 1:3, or from about 2:1 to about 1:2. In an embodiment, blending may be at about a 50/50 mix (i.e., 1:1 weight ratio). In another embodiment, blending may be at about a 30/70 mix (i.e., 1:3 weight ratio). In yet another embodiment, blending may be at about a 70/30 mix (i.e., 3:1 weight ratio). Stated another way, blending of the granular material with the composite particles may be such that either component may be present from about 20% to about 80% by weight, from about 30% to about 70% by weight, from about 40% to about 60% by weight and from about 50% to 50% by weight.

d. Particle Size Distribution and Low Dusting Characteristics

A particle size distribution of 16/50 has been found to work particularly well, and inclusion of particles larger than 16 mesh (e.g., 8 to 14 mesh) may result in increased fines generation as the larger particles are believed to rub against one another, generating fines (dust) through attrition. Without being bound by theory, it is theorized that by excluding such larger particles, less attrition occurs between the particles, and less dusty fines are present in the final product, e.g., after shipping to a retailer or consumer. Exclusion of the larger particle sizes may be at least partially responsible for the reduced dust generation exhibited by the present litter compositions, e.g., as compared to a litter having a particle size distribution of 12/40 or 8/40.

The same may be said for a slight change to the bottom end cut-off. For example, at least some of the benefits described herein may be obtained at a lower end cut-off of, for example, 50 mesh (300 μm), rather than 40 mesh (425 μm). That said, with such a lower cut-off, one would expect increased dust generation as compared to a 40 mesh cut-off. The fact that lower dusting is achieved by including smaller particles or fines is surprising. Smaller particles are lighter and more likely to become airborne, which contribute to dust generation.

In an embodiment, the litter composition may be free or substantially free of fine particles that would pass through a size 100 mesh (e.g., 0.150 mm or 150 μm sieve opening). For example, as manufactured, or after shipping to a retailer or consumer, the composition may not include more than about 10%, more than about 5%, more than about 4%, more than about 3%, more than about 2.5%, more than about 2%, more than about 1.5%, or more than about 1% of such fines. The presence of such fines can lead to increased dust and poor tracking characteristics. For example, such lightweight fines adhere to the cat's or other pet's fur when in the litter box, and are "tracked out" or carried out on the pet, as it leaves the litter box. Such adhered fines then fall off the pet, e.g., onto the floors, carpets, walls, furniture and the like surrounding the litter box. Such tracking is undesirable. In addition, such fines contribute to dust generation when pouring such a litter product. While some amount of fines smaller than the lower end cut-off (e.g., 50 mesh) may eventually form due to attrition of larger particles, the present litter products have been found to provide for excellent low dusting characteristics, even without inclusion of a de-dusting agent, such as PTFE, lignosulfonate or mineral oil.

By way of example, the litter product may generate no more than about 25 g, no more than about 20 g, no more than about 15 g, or no more than about 10 g of dust in a gravimetric dust measurement, with a 850 cc litter sample.

Mesh sizes and particle sizes will be familiar to those of skill in the art. Various mesh size characteristics are shown below in Table 1.

TABLE 1

| Sieve Size (mm) | Opening (μm) | U.S. Standard Mesh Size |
| --- | --- | --- |
| 5.60 | 5600 | 3.5 |
| 4.75 | 4750 | 4 |
| 4.00 | 4000 | 5 |
| 3.35 | 3350 | 6 |
| 2.80 | 2800 | 7 |
| 2.36 | 2360 | 8 |
| 2.00 | 2000 | 10 |
| 1.70 | 1700 | 12 |
| 1.40 | 1400 | 14 |
| 1.18 | 1180 | 16 |
| 1.00 | 1000 | 18 |
| 0.85 | 850 | 20 |
| 0.71 | 710 | 25 |
| 0.60 | 600 | 30 |
| 0.50 | 500 | 35 |
| 0.425 | 425 | 40 |
| 0.355 | 355 | 45 |
| 0.300 | 300 | 50 |
| 0.25 | 250 | 60 |
| 0.212 | 212 | 70 |
| 0.180 | 180 | 80 |
| 0.15 | 150 | 100 |
| 0.125 | 125 | 120 |
| 0.105 | 105 | 140 |
| 0.090 | 90 | 170 |
| 0.075 | 75 | 200 |

While particle size distributions of 8/40 or 12/40 have been routinely selected in the art, Applicant has found there are significant benefits associated with selecting 16/50, in terms of significantly reduced dust generation, and increased absorbency, so as to provide reduced clump depth, improved clump geometry (i.e., reduced clump width at the bottom of the clump), and overall more efficient use of the litter in clumping. These results are further enhanced when at least a portion of the litter is comprised of engineered, composite particles.

e. Clumping Characteristics

By way of example, the litter product may exhibit a clump depth of no more than about 2 cm, no more than about 1.5 cm, no more than about 1.25 cm, or no more than about 1 cm (e.g., 0.5 cm to 1 cm) when dosed with 10 g of water.

By way of example, the litter product may exhibit a clump weight of no more than about 30 g, or no more than about 30 g, or no more than about 25 g or no more than about 20 g (e.g., 20 to 30 g) when dosed with 10 g of water, including the water weight. When including just the litter weight, the clump weight of litter in the clump may be no more than about 20 g, no more than about 15 g, or no more than about 10 g (e.g., 10 g to 20 g) when dosed with 10 g of water, excluding the water weight.

Stated another way, the present litter product may exhibit an absorbency that is higher than a comparable litter composition, having a standard particle size distribution (e.g., 8/40 mesh, or 12/40 mesh). For example, the litter product may exhibit an absorbency that is at least 30%, at least 40%, at least 45%, at least 50%, at least 60%, at least 70%, at least 80%, at least 90%, or at least 100% higher than an otherwise comparable litter product having a 8/40 (or 12/40) mesh particle size distribution. A doubling of absorption corresponds to a reduction in clump weight of about 50%. The experimental results below show clump weight reductions of greater than 50%, such that it will be apparent that absorbency of the present litter composition can be increased 100% or more, as compared to litter compositions having more typical particle size distributions.

IV. Examples and Experimental Results a. Gravimetric Dust Measurement

The gravimetric dust measurement test measures the tendency of a litter product to generate dust during a consistent pouring from a specific height and duration. Two 850 cc samples of each litter product to be tested were weighed out. Filter paper of a standardized measurement (e.g., 9"×4") was provided, and its initial weight recorded. The gravimetric dust measurement unit consists of an enclosure which is fitted with a drop funnel and slide gate assembly used to drop the litter into a vessel in the enclosure. An external fan is used to pull air, with the dust from the enclosure though filter paper holder assembly. The filter paper was placed into the sample holder on the gravimetric dust measurement unit, and the litter product to be tested was poured into the cone at the top of the gravimetric dust measurement unit. The vacuum fan of the gravimetric dust unit was activated, and after 5 seconds, the lever under the cone was opened, allowing the litter in the cone to fall. The vacuum was allowed to run for 30 seconds after the lever was opened (35 seconds total). After shutting off the vacuum fan, the sample holder was opened, and the filter paper removed. The filter paper including dust captured therein is reweighed. The difference between the initial weight and the final weight (in mg) is the amount of dust generated for the 850 cc sample.

Three different litter samples were tested, each with multiple repetitions. The results for the gravimetric dust measurement are shown in FIG. 1. The comparative example "control", had a size distribution of 8/40 and is a litter product comprised of composite particles, as described in Applicant's U.S. Pat. No. 10,383,308. The two litter products (Example 1 and Example 2) are exemplary of the present invention include a litter product comprised entirely (i.e., 100%) of composite particles, otherwise similar to the control, but with a 16/50 particle size distribution. This litter product is referred to as Example 1 in the Figures. As compared to the control, Example 1 included some additional smaller particles (those that would pass through a 40 mesh, but not a 50 mesh), as well as excluding some of the larger particles that were included in the control (those that would pass through an 8 mesh, but not a 16 mesh). The litter product of Example 2 had the same 16/50 particle size distribution as Example 1, but the composite particles had been blended at a 1:1 weight ratio with granular sodium bentonite, forming a salt/pepper blend of the granular sodium bentonite and the composite particles. Both the granular sodium bentonite and the composite particles have the same 16/50 particle size distribution. In other words, the blended litter product as a whole had a 16/50 particle size distribution. As shown in FIG. 1, both Examples 1 and 2 exhibit significantly improved dusting characteristics as compared to the comparative example "control", with Example 1 showing a dust reduction of 64%, and Example 2 showing a dust reduction of 88% as compared to the control. This is the case, even where the comparative example included a PTFE de-dusting agent, while neither of Examples 1 or 2 included any such de-dusting agent.

b. Clump Depth and Clump Weight Measurements

Figure 2:
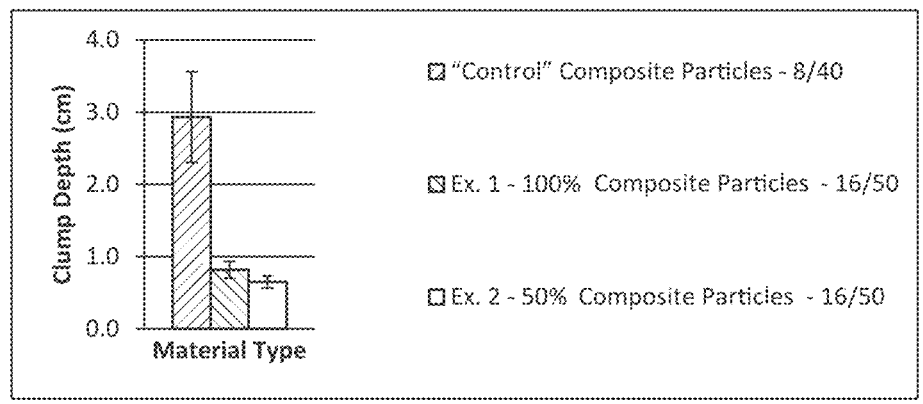
FIG. 2 shows results of a clump depth measurement test for two litter products according to the present invention, as compared to a comparative litter product.

Three litter samples were tested, each with multiple reps. The results for the clump depth measurement are shown in FIG. 2. As in the gravimetric dust measurement, the comparative example "control", having a size distribution of 8/40 is a litter product comprised of composite particles, as described in Applicant's U.S. Pat. No. 10,383,308. The same Example 1 and Example 2 litter products were tested as compared to the comparative example "control". To determine clump depth, the litter box was filled with the litter to be tested to a depth of 3-4 inches. The litter was leveled, so as to present a flat surface in the litter box. The litter being tested was dosed with 10 mL (10 g) of water using a pipette. Once the clumps solidified, they were removed from the litter box, and the depth of the clump was measured with a ruler. Each litter product tested included 6 reps. The weight of each clump was also determined, and recorded. The mass of litter in each clump was also determined, by subtracting out the 10 g of liquid dosed for each clump. As shown in FIG. 2, both of Examples 1 and 2 exhibit significantly reduced clump depth values as compared to the comparative example "control", with Example 1 showing a clump depth reduction of 72%, and Example 2 showing a clump depth reduction of 78% compared to the control.

Figure 3:
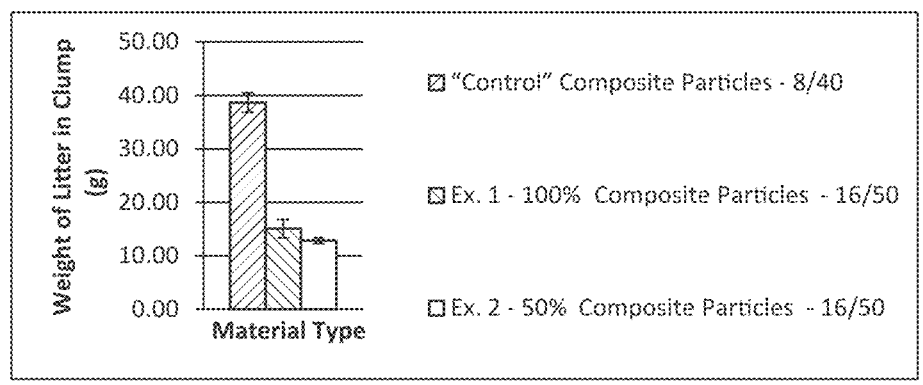
FIG. 3 shows results of a test measuring the weight of litter in a clump for two litter products according to the present invention, as compared to a comparative litter product.

The weight of the clumps is shown in FIG. 3. Both of Examples 1 and 2 exhibit significantly reduced clump weight values as compared to the comparative example "control", with Example 1 showing a clump weight reduction of 48%, and Example 2 showing a clump weight reduction of 53%. For mass of litter in the clump (i.e., after subtracting out the 10 g of water used to form each clump), Example 1 showed a reduction in litter in the clump of 61%, while Example 2 showed a reduction in litter in the clump of 67%. Table 2 below shows a summary of the data for dusting, clump depth, clump weight, and litter in the clump for Examples 1-2 as compared to the comparative example "control".

TABLE 2

| | Comparative Example "Control" - 100% Composite Particles - 8/40 | Ex. 1 - 100% Composite Particles - 16/50 | Ex. 1 Percent Reduction from Control | Ex. 2 - 50% Composite Particles - 16/50 | Ex. 2 Percent Reduction from Control |
|---|---|---|---|---|---|
| Dust (mg) | 31.7 | 11.5 | 64% | 3.8 | 88% |
| Clump Depth (cm) | 2.9 | 0.8 | 72% | 0.7 | 78% |
| Clump Weight (g) | 48.7 | 25.1 | 48% | 22.8 | 53% |
| Litter in Clump (g) | 38.7 | 15.1 | 61% | 12.8 | 67% |

Compositional characteristics of the tested litter products were as shown below in Table 3.

TABLE 3

| | Comparative Example "Control" - 100% Composite Particles - 8/40 | Ex. 1 - 100% Composite Particles - 16/50 | Ex. 2 - 50% Composite Particles - 16/50 |
|---|---|---|---|
| Limestone (%) | 0-70 | 0-50 (40) | 0-25 (20) |
| PAC (%) | <1 | 1.5-3 (3) | 1.5-3 (3) |
| Sodium Bentonite (%) | 30-98.5 | 47-98.5 (57) | 72-98.5 (77) |

The composite particles in Example 2 were substantially identical to those in Example 1. The difference in litter products being that in Example 2, those composite particles were mixed with granular sodium bentonite at a 1:1 weight ratio. In both Example 1 and Example 2, odor control of the litter product was found to be comparable or improved, compared to the comparative example "control", and far superior to that of a litter product consisting of granular sodium bentonite.

By way of further example, absorbency using cat urine, gravimetric dust measurement, and a visual dust measurement were conducted for an additional exemplary litter composition (Example 3) having 16/50 particle size distribution, as compared to a conventional commercially available 8/40 particle size distribution litter product. The results are shown in Table 4A below.

TABLE 4A

| | Ex. 3 - 16/50 | Comparative Commercially Available Litter Example - 8/40 | % Improvement |
|---|---|---|---|
| Specific Absorbency (g urine/g litter) | 0.66 | 0.34 | 91% |
| Gravimetric Dust (mg) | 6.8 | 24 | 72% |
| Visual Dust Level | 61 | 119 | 49% |

For the absorbency test, a programmable peristaltic pump is used to dispense 35 mL (nominally 36 g) of synthetic cat urine on the litter. Prior to each test, the peristaltic pump is calibrated and the actual mass of dispensed urine is recorded. This may vary between about 35 and 40 g. The urine is allowed to absorb into the litter and the clump is allowed to strengthen such that it may be removed in one piece. This absorption and strengthening typically takes between 3 and 5 seconds. The mass of the wet clump is then measured. The dry mass of litter used is calculated by subtracting the known mass of urine dispensed. Further calculation may be then conducted to calculate the specific absorbency of a litter defined as grams of urine absorbed per gram of litter. The gravimetric and visual dust measurements were conducted as described herein. The compositional characteristics for Example 3 and the comparative example in Table 4A are shown below, in Table 4B.

TABLE 4B

| | Ex. 3 - 16/50 | Comparative Commercially Avilable Example - 8/40 |
|---|---|---|
| Sodium Bentonite (%) | 95.38% | 68.08% |
| Limestone (%) | 0% | 30% |
| PAC (%) | 1.55% | 0.25% |
| Dedusting Agent | 2.55% | 1.06% |
| Other | 2% | 0.5% |

The Example 3 litter is comprised of approximately 30-50% engineered composite particles, with the balance being granular sodium bentonite particles. The comparative example is comprised of approximately 15-25% engineered composite particles, with the balance including granular sodium bentonite particles. Even though Example 3 includes a de-dusting agent, other examples included herein illustrate that such is not required to still achieve significantly improved low dusting characteristics, as compared to conventional litter products.

The visual dust level was evaluated as follows. A high speed black and white camera was used to capture images of litter being dropped into a litter box. Image analysis was used to assess the level of dust in each frame. The litter was riffle split to ensure representative sampling. Two 64 oz samples were portioned out by volume. Samples were loaded into an automated hopper above a light box. Once the measurement program was started, the hopper was opened, allowing litter to fall into the view of the camera below. The camera recorded data for 60 seconds. The numerical result as reported in Table 4A was generated by taking the mean value of dust as measured by the brightness on a scale of 0 to 255 of each captured pixel in the output image. Litter dust is substantially lighter than the black background of the light box, and it is possible to measure very small quantities of dust. The analysis frame is chosen manually such that it is the first frame in which a falling stream of litter is no longer captured by the camera. This represents a state of maximum airborne dust while removing measurement error from falling macroscopic litter particles.

Average particle size for the comparative control product (with a particle size distribution of 8/40) was 1009 μm (1.009 mm), while average particle size for example 3 (with a particle size distribution of 16/50) was 635 μm, so that the average particle size for example 3 (16/50) was 59% smaller than the 8/40 comparative example. As described herein, the significantly smaller average particle size of the present lifter products provides significantly improved absorbency and significantly reduced dust levels.

Figure 4:
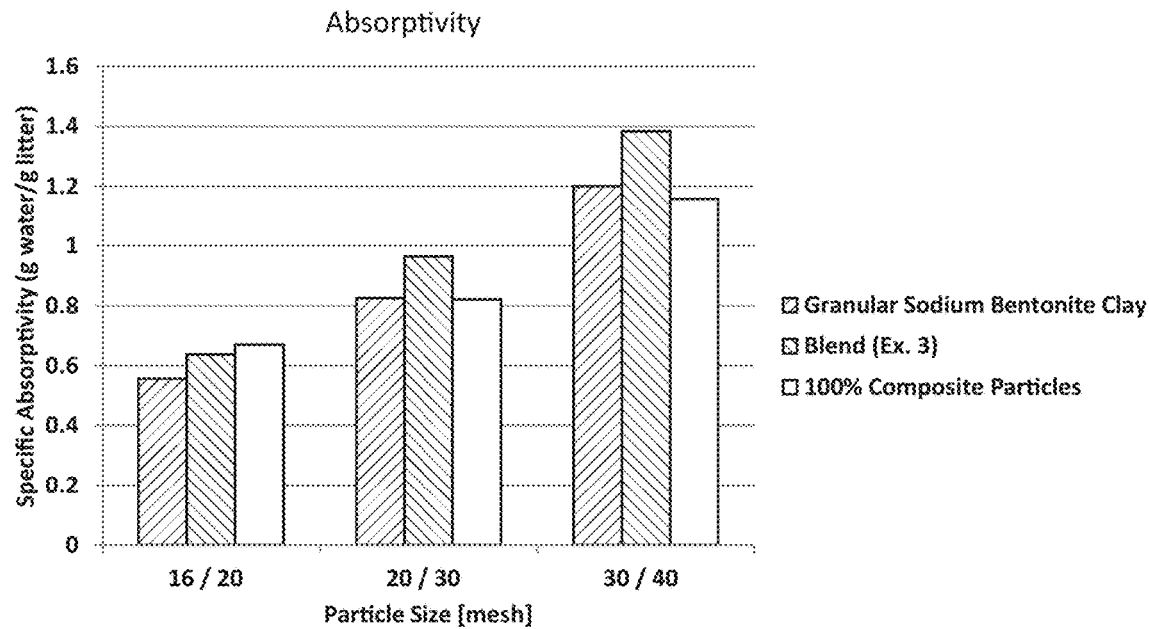
FIG. 4 charts specific absorbency (g water/g litter) for various subset particle size distributions, for 3 different litter configurations (granular sodium bentonite clay, 100% engineered composite particles, and a blend of engineered composite particles and granular sodium bentonite clay).

FIG. 4 charts specific absorbency (in g of water per g of litter) for various subset particle size distributions, for 3 different litter configurations, specifically for 100% granular sodium bentonite, for 100% engineered composite particles, and for a blend of engineered composite particles and granular sodium bentonite, such as in example 3 above. As shown in FIG. 4, absorbency increases with decreasing particle size. For example, the subset or "cut" of particles with a 16/20 particle size distribution have the lowest absorbency, while the subset or "cut" of particles with a 30/40 particle size distribution have the highest absorbency. The even smaller particles (e.g., subset or "cut" of particles with a 40/50 particle size distribution) would have even higher absorbency than the 30/40 subset or "cut".

The other interesting and surprising result shown in the data of FIG. 4 is that the engineered composite particles, and blends including such composite particles, exhibit the highest absorbency. It is particularly interesting that the blend of composite particles and granular sodium bentonite exhibits the very highest absorbency (even higher than the 100% engineered composite particles, with the same particle size distribution). There is a noticeable synergy exhibited in the results of FIG. 4, as one would expect the blend of composite and simple screened granular sodium bentonite particles to exhibit absorbency between that provided by these two components, alone. FIG. 4 shows that this is not the case (particularly for the 20/30 and 30/40 particle size subsets), but that the blend exhibits absorbency that is higher than either component alone. Based on the data shown in FIG. 4, the 40/50 subset portion of the claimed 16/50 particle size distribution would also be expected to exhibit synergistically elevated specific absorptivity.

Figure 5:
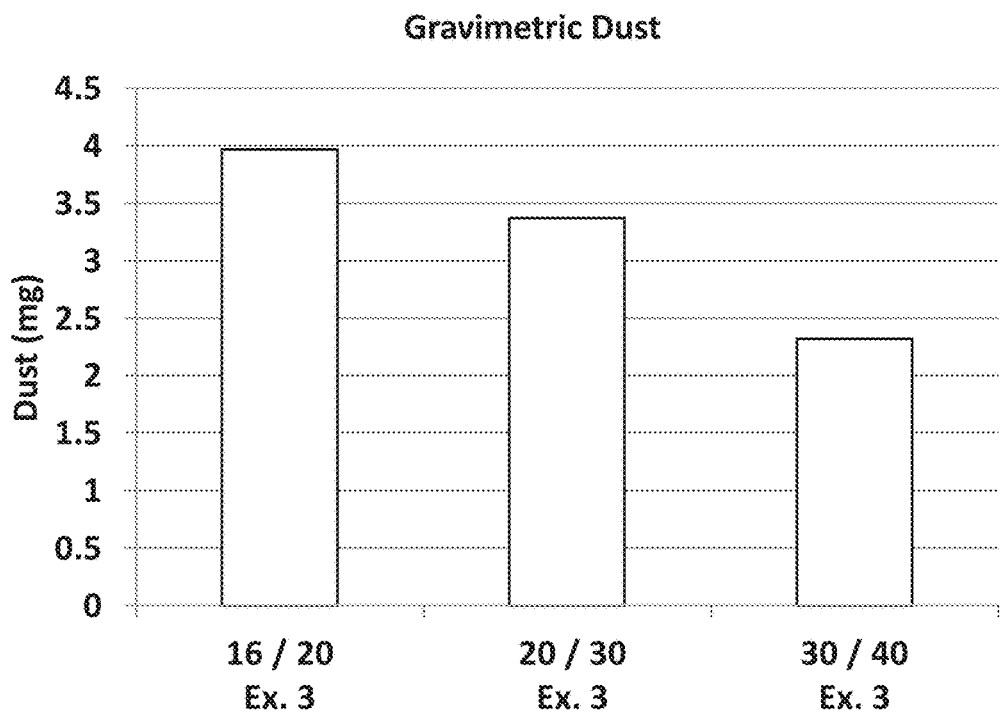
FIG. 5 shows results of another gravimetric dust measurement test for the various subset particle size distributions, for the litter composition of FIG. 4 including a blend of engineered composite particles and granular sodium bentonite clay.

FIG. 5 also shows results that were surprising to Applicant. In particular, FIG. 5 shows gravimetric dust measurements, for various subsets of the 16/50 particle size distribution, for a blend of composite particles and granular sodium bentonite (e.g., the blend of Example 3). As shown in FIG. 5, less dust generation is provided by use of smaller particles. For example, the 16/20 particles (the largest particles in the 16/50 distribution) generate nearly 4 mg of dust in a gravimetric dust measurement as described herein. As shown in FIG. 5, the 20/30 subset of particles generate less dust (between 3 and 3.5 mg), even though such particles are smaller, and the 30/40 subset of particles only generate between 2 and 2.5 mg of dust. It is surprising that the smaller particles actually generate less dust than the larger particles. Table 5 below shows additional gravimetric dust measurement values for various particle size subsets, including some subsets that are larger than the 16 mesh minimum size of a 16/50 particle size distribution. It is readily apparent that the larger particle sizes result in significantly greater dust generation, which characteristic is surprising, as it was thought that the smaller particles would be responsible for relatively greater dust generation. The litter product that was the subject of the testing shown in Table 5 is for a litter product comprised of a blend of composite particles and granular sodium bentonite clay particles as described herein sprayed with a PTFE de-dusting agent (e.g., similar or identical to the composition of Example 3 as shown in Table 4B). The blend included 30-50% composite particles, with the other 50-70% being granular sodium bentonite clay particles. To reach the above particle size brackets or subsets, all litter went through a sieving process. Gravimetric dust testing was then conducted as described above. Bulk samples of 6/25 and 16/50 litter of substantially the same composition as Ex. 3 were screened using a Sweco vibratory separator. Each subset of material e.g., 10/16 was mixed and riffle split to ensure homogeneity.

TABLE 5

| Particle Size Subset | Gravimetric Dust (mg) |
|---|---|
| 6/10 | 11.1 |
| 10/16 | 4.6 |
| 16/20 | 4.0 |
| 20/30 | 3.4 |
| 30/40 | 2.3 |

In order to better understand the dusting characteristics of the present litter products characterized by the 16/50 particle size distribution as compared to a conventional 8/40 particle size distribution, another gravimetric dust measurement was conducted, but in which both litter compositions were intentionally dosed with 2.5 wt % sodium bentonite clay dust particles (200 mesh, 75 µm), to see how such addition of dust fines would affect the gravimetric dust measurement. An initial baseline gravimetric dust measurement was first obtained (e.g., using the same methodology described herein), after which both litter products were dosed with the 2.5 wt % of 200 mesh (75 µm) dust particles. After thorough mixing of the dust dosage into the litter products, the litter products were retested for gravimetric dust. The results are shown in Table 6.

TABLE 6

| | Comparative Commercially Available Example - 8/40 | Ex. 3 - 16/50 |
|---|---|---|
| Initial Dust (mg) | 29.5 | 6.5 |
| Dust after Dosing | 115.5 | 48.1 |
| Change in Dust (mg) | 86 | 41.6 |

As compared to the comparative example, Example 3 exhibited a 52% lower increase in measured gravimetric dust despite having the same amount of dust spiked into the product. While perhaps not completely understood, the use of the smaller particle litter (16/50 distribution compared to 8/40 distribution) results in significantly better suppression of existing dust. While perhaps not completely understood, the use of the smaller particle litter (16/50 distribution compared to 8/40 distribution) results in significantly better suppression of existing dust. The use of such smaller particles is somehow able to act as a very effective de-dusting agent, without addition of traditional de-dusting agents, such as PTFE, lignosulfonate or mineral oils.

Figure 7A:
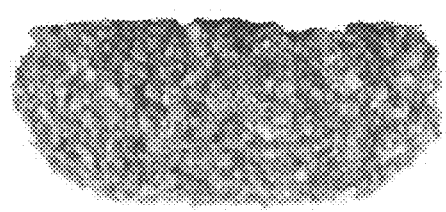
FIGS. 7A and 7B illustrate side views, or cross-sectional views of the shape of representative clumps, that form from both of such litter products of FIG. 6. The 8/40 "control" litter product clump is shown in FIG. 7A, while the 16/50 litter product clump is shown in FIG. 7B.
Figure 7B:
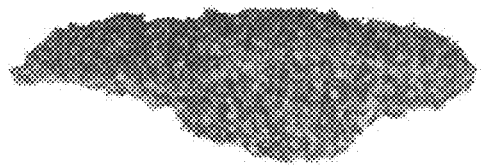

The clumping shape characteristics of the 8/40 comparative example and the 16/50 example 4 litter product were also evaluated. FIGS. 7A and 7B illustrate side views, or cross-sectional views of the shape of representative clumps, that form from both of such litter products. The 8/40 "control" litter product clump is shown in FIG. 7A, while the 16/50 litter product clump is shown in FIG. 7B. Each were dosed in a similar manner as described herein with a predetermined amount of liquid (e.g., 10 g or 20 g), and allowed to clump.

The clump shape difference between the two litter products is significant, where the clump of FIG. 7A exhibits a generally hockey puck type shape, with relatively consistent width to the clump, at the top, middle and bottom. The clump of FIG. 7B, on the other hand, is significantly different in shape, e.g., resembling an upside down hat, with a wide "brim" at the top of the clump, and a significantly narrower width at a "dome" portion, at the bottom of the clump. This difference in shape is important, as there is a tendency with existing litter product clumps to strongly stick to the bottom of the litter box, when the clump forms as in FIG. 7A, with the bottom of such a hockey puck shape in contact with the bottom of the litter box. Because the width and surface area associated with the bottom of such a clump is relatively high at the bottom of the clump, a strong bond forms between the bottom of such clump, and the bottom of the litter box. On the other hand, a clump shape such as seen in FIG. 7B exhibits a significantly smaller width and surface area at its bottom "dome", which reduces the tendency of such a litter product to strongly bond to the bottom of the litter box. For example, even if the "dome" portion of the clump contacts the bottom of the box, this contact surface area or contact width with the bottom of the litter box is significantly less, such that a far weaker bond results, allowing the clump to be broken free of the bottom of the box much easier, if such bonding occurs at all.

Figure 6:
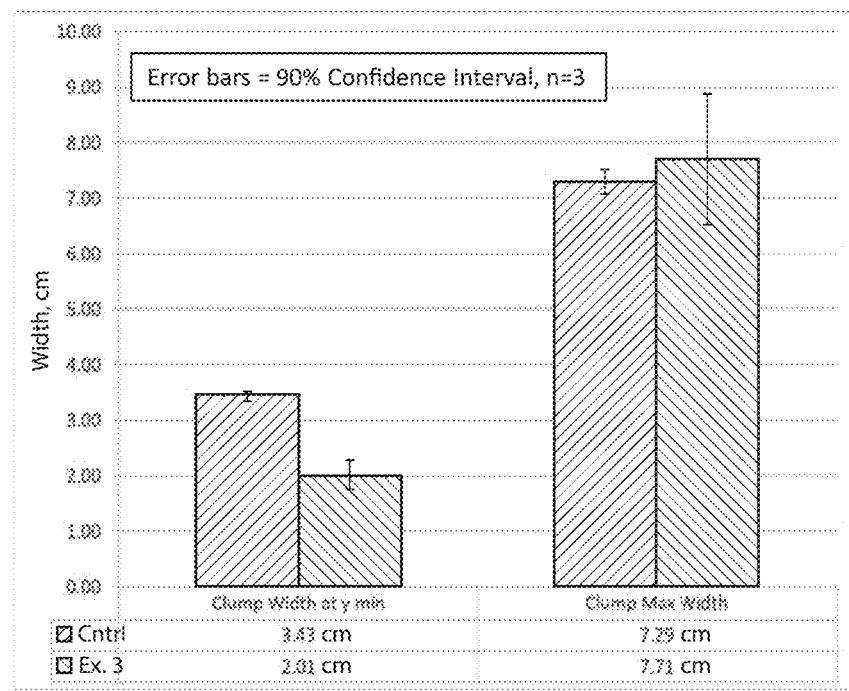
FIG. 6 shows results of a clump width measurement test at the bottom of the clump (where sticking to the bottom of the litter box would occur), as well as maximum clump width, demonstrating how the present litter compositions tend to form a clump shape resembling an "upside down hat" shape, rather than the typical "hockey puck" shape exhibited by clumps formed under similar conditions, with a comparative litter composition.

For clumps such as those seen in FIGS. 7A-7B, FIG. 6 charts clump width at the bottom of the clump (i.e., y axis minimum value), where sticking to the bottom of the litter box would occur. FIG. 6 also shows the maximum clump width, demonstrating how the present litter products with a 16/50 particle size distribution tend to form a clump shape that is narrower at the bottom, and wider at the top, rather than the typical hockey puck shape which exhibits similar width at the bottom (y axis minimum value) as at all other y axis locations throughout the clump. For example, FIG. 6 shows how the 16/50 litter product exhibits a width at the bottom of the clump (y axis minimum) of only 2.01 cm, while the bottom of the clump formed from the 8/40 litter product is far wider, e.g., 3.43 cm. Such equates to a width reduction of 41%. The surface area reduction will be even greater, as surface area relates to the width as a squared function. In an embodiment, width at the bottom of the clump may be reduced by at least 20%, at least 25%, at least 30%, or at least 35%. Such narrower width to the clump bottom greatly reduces the tendency of the clumps to strongly bond to the bottom of the litter box. Such measurements can be taken in a variety of ways (e.g., image capture, followed by measurement of the relevant regions, use of calipers, etc.). The measurements reported in FIG. 6 were made on color plane extracted images using National Instruments Vision Assistant "Clamp Rake" tool for edge detection at maximum width, based on manually drawn regions of interest at the y-axis minimum and for the whole clump. The error bars in FIG. 6 are for a 90% confidence interval.

Many litter products add an oil (e.g., mineral oil or the like), in an effort to reduce formation of such clumps that would strongly bond to the bottom of the litter box. The present litter products are able to minimize or reduce such bonding to the bottom of the litter box without the need for any such oil or other bond weakening agents, by adjusting the particle size distribution of the litter particles as described herein (e.g., specifically by ensuring that the litter has a particle size distribution of 16/50, rather than 8/40).

By way of example, analysis of the bonding surface area at the bottom of clumps such as those shown in FIGS. 7A-7B, and analyzed in conjunction with FIG. 6, show an average surface area at the bottom of the clump of 184.4 mm$^2$ for an example such as that seen in FIG. 7B, for a litter composition having the present inventive particle size distribution of 16/50. By comparison, the comparative 8/40 litter composition (FIG. 7A) exhibited an average surface area at the bottom of the clump of 371.6 mm$^2$. Such differences represent about a 50% reduction in bonding surface area, which is very significant, as the inventive litter compositions have far less tendency to strongly bond to the bottom of the litter box during typical use, by comparison. In an embodiment, bonding surface area at the bottom of the clump may be reduced by at least 20%, at least 25%, at least 30%, at least 35%, at least 40%, or at least 45% as compared to a conventional 8/40 litter composition. Stated another way, with dosing and testing parameters similar to those used in conjunction with FIGS. 6 and 7A-7B, bonding surface area at the bottom of the present clumps may be no more than 325 mm$^2$, no more than 300 mm$^2$, no more than 250 mm$^2$, no more than 225 mm$^2$, or no more than 200 mm$^2$.

Without departing from the spirit and scope of the invention, one of ordinary skill can make various changes and modifications to the invention to adapt it to various usages and conditions. As such, these changes and modifications are properly and intended to be, within the full range of equivalence of the following claims.

The invention claimed is:

1. An animal litter comprising:
   composite particles including powdered sodium bentonite and powdered activated carbon agglomerated together into the composite particles;
   wherein the animal litter ranges in size from about 300 μm to about 1180 μm (16/50 mesh);
   wherein the litter exhibits an absorbency that is at least 40% greater than a litter product having a particle size distribution of about 425 μm to about 2360 μm (8/40 mesh).

2. The litter of claim 1, wherein the litter further comprises granular sodium bentonite dry mixed with the composite particles, wherein both the granular sodium bentonite and the composite particles have a particle size distribution of 16/50 mesh.

3. The litter of claim 2, wherein composite particles comprise about 20% to about 80% by weight of the litter.

4. The litter of claim 2, wherein composite particles comprise about 30% to about 70% by weight of the litter.

5. The litter of claim 1, wherein the powdered activated carbon is present in an amount of greater than 1% by weight of the litter.

6. The litter of claim 1, wherein the powdered activated carbon is present in an amount of greater than 1% to about 1.5% by weight of the litter.

7. The litter of claim 1, wherein the powdered activated carbon is present in an amount of greater than 1% to about 5% by weight of the litter.

8. The litter of claim 1, wherein the litter is void of a de-dusting agent.

9. The litter of claim 1, wherein the litter exhibits low dusting characteristics of no more than about 20 mg as measured in a gravimetric dust measurement with an 850 cc litter sample, while being void of de-dusting agents.

10. The litter of claim 1, wherein the litter exhibits a clump depth of no more than about 2 cm upon dosing with 10 g of water or urine.

11. The litter of claim 1, wherein the litter exhibits a clump depth of no more than about 1.5 cm upon dosing with 10 g of water or urine.

12. The litter of claim 1, wherein the litter exhibits a clump depth of from about 0.5 cm to about 1 cm upon dosing with 10 g of water or urine.

13. The litter of claim 1, wherein the litter exhibits a clump weight of no more than about 30 g upon dosing with 10 g of water or urine.

14. The litter of claim 1, wherein the litter exhibits a clump weight of no more than about 25 g upon dosing with 10 g of water or urine.

15. The litter of claim 1, wherein the litter exhibits a clump weight of from about 20 g to about 30 g upon dosing with about 10 g of water or urine.

16. The litter of claim 1, wherein the composite particles further comprise a powdered filler material.

17. The litter of claim 16, wherein the powdered filler material is an inorganic filler material.

18. The litter of claim 16, wherein the powdered filler material is selected from the group consisting of limestone, dolomite, calcite, calcium carbonates, sand, shale, gravel and slate.

19. An animal litter comprising:
a blend of granular clay material and composite particles;
wherein the composite particles include powdered sodium bentonite and powdered activated carbon agglomerated together into the composite particles;
wherein the animal litter ranges in size from about 300 μm to about 1180 μm (16 to 50 mesh);
wherein the composite particles are present in the blend in an amount of about 20 to about 50% by weight and the granular clay material is present in an amount of about 50 to about 80% by weight of the blend;
wherein the blend exhibits an absorbency that is at least 40% greater than a litter product having a particle size distribution of about 425 μm to about 2360 μm (8/40 mesh).

20. The litter of claim 19, wherein the granular clay material is granular sodium bentonite.

* * * * *